United States Patent
Diaz (10) Patent No.: US 9,667,907 B2
(45) Date of Patent: May 30, 2017

(54) SYSTEM AND METHOD FOR HAPTIC INTEGRATION AND GENERATION IN MULTIMEDIA DEVICES

(71) Applicant: Vicente Diaz, Madrid (ES)

(72) Inventor: Vicente Diaz, Madrid (ES)

(*) Notice: Subject to any disclaimer, the term of this patent is extended or adjusted under 35 U.S.C. 154(b) by 0 days.

(21) Appl. No.: 14/851,455

(22) Filed: Sep. 11, 2015

(65) Prior Publication Data

US 2016/0080682 A1 Mar. 17, 2016

Related U.S. Application Data

(60) Provisional application No. 62/050,085, filed on Sep. 13, 2014.

(51) Int. Cl.
| | |
|---|---|
| *H04N 5/00* | (2011.01) |
| *H04N 5/765* | (2006.01) |
| *G11B 27/10* | (2006.01) |
| *G06F 3/01* | (2006.01) |
| *H04N 21/236* | (2011.01) |
| *H04N 21/234* | (2011.01) |
| *H04N 21/81* | (2011.01) |
| *A63F 13/285* | (2014.01) |
| *H04N 7/00* | (2011.01) |
| *G10L 21/06* | (2013.01) |

(52) U.S. Cl.
CPC .......... *H04N 5/765* (2013.01); *A63F 13/285* (2014.09); *G06F 3/016* (2013.01); *G11B 27/10* (2013.01); *H04N 21/23418* (2013.01); *H04N 21/23614* (2013.01); *H04N 21/8133* (2013.01); *G10L 21/06* (2013.01)

(58) Field of Classification Search
CPC .. H04N 5/00; H04N 7/00; G06F 3/016; G06F 3/0017; G06F 3/0346
USPC ....................... 386/200, 241, 248; 340/407.1
See application file for complete search history.

(56) References Cited

U.S. PATENT DOCUMENTS

| | | | |
|---|---|---|---|
| 8,842,969 B2* | 9/2014 | Wikander | H04N 9/8205 386/248 |
| 2009/0128306 A1* | 5/2009 | Luden | G06F 3/016 340/407.1 |
| 2014/0139448 A1* | 5/2014 | Levesque | G06F 3/041 345/173 |

\* cited by examiner

*Primary Examiner* — Daquan Zhao
(74) *Attorney, Agent, or Firm* — Lucas & Mercanti, LLP (57) ABSTRACT

The present disclosure is a method for the generation and integration of physical information in multimedia files synchronously, to be played in mobile phones, tablets, and other electronic devices, to represent physical and mechanical magnitudes related with the action being recorded and/or played. The present disclosure presents at least a first electronic device comprising sensors that measure physical magnitudes and means of multimedia recording, where those magnitudes are processed and converted to control patterns that are integrated with the multimedia recording and a second, or the same, electronic device comprising programmable functions to decode and play multimedia files, means to extract the control patterns from the multimedia file, and means to use those patterns to control physical actuators integrated or connected to the device to reproduce haptic information related with the multimedia file in order to improve the user multimedia experience.

20 Claims, 9 Drawing Sheets

SYSTEM AND METHOD FOR HAPTIC INTEGRATION AND GENERATION IN MULTIMEDIA DEVICES

STATEMENT REGARDING FEDERALLY SPONSORED RESEARCH AND DEVELOPMENT

N/A

RELATED APPLICATIONS

N/A

REFERENCE TO SEQUENCE LISTING, A TABLE, OR A COMPUTER PROGRAM LISTING COMPACT DISK APPENDIX

N/A

FIELD OF THE DISCLOSURE

The present disclosure is in the technical field of content generation of digital multimedia, referring to content that uses a combination of different content forms including a combination of text, audio, still images, animation, video, or interactivity content forms. More particularly, the present disclosure is in the technical field of electronic multimedia devices and particularly mobile phones and tablets and the like.

BACKGROUND OF THE DISCLOSURE

It is well known that nowadays multimedia information is one of the most employed media to communicate information over Internet and other communication and broadcast media. Audio and video content, related with artistic, technical, advertising, musical or personal scope, are shared and published by means of online platforms like Youtube, Vimeo, Spotify, iTunes, Playstore, etc.

Nevertheless, current multimedia player devices are unable to reproduce, in a dynamic and real time fashion, physical and mechanical information related with the action played in the multimedia content when multimedia was recorded or edited. Authors like Herbert Read, call this physical content as "haptic" to refer to the set of physical feelings, neither visual nor acoustic, sensed by individuals, which enrich their sensory experience.

For example, a video file recorded from a formula one car cockpit is not able to reflect any real time information of the physical effects occurring during the recording: bumping, acceleration, breaking, piano passing on curves, etc.

Further, from the point of view of the viewer of a car race, it is not possible to perceive how cars approach and move away from him/her, by feeling real ambience increasing and decreasing vibrations due to engine throttle, as these haptic information is not reproducible using current multimedia players included in a mobile phone or tablet.

On the other hand, wearable equipment, such as helmet or glasses with integrated cameras, is commonly used for recording day life and sport activities like trekking, climbing, biking, diving, skydiving, and many other activities. These recording are oftentimes uploaded to the Internet in order to share them with friends and family or to commercialize them as advertisement, documentaries, etc.

Movement such as jumps, acceleration, deceleration, upwards and downwards movement, rhythm changes and, in general, speed and position changes are easily measurable by mobile devices using integrated sensors and can be stored in the device or sent to a remote server. Other physical parameters that are easily measurable include temperature, pressure and other environmental conditions. All of these physical parameters may be included in a multimedia recording. Unfortunately, despite having several sensors that offer accurate information, current mobile devices and smart phones lack the physical interfaces to reproduce such information in order to be perceived by the user when playing.

Nevertheless, it is well known that physical sensations related with the environment during the recording of a multimedia file can be represented and recognized by the user by means of vibration patterns using a controllable vibrator like the one provided in most current mobile phones and tablets. These techniques are highly spread among game developers although in a limited way (Nintendo Wii or Microsoft Xbox among others) in order for the player to perceive the game environment thus, providing a better game experience when hitting, punching, kicking, explosions, etc.

In the mobile industry there are some applications and companies that allow some level of haptic sensations while playing a game in a smartphone. Some companies, like Immersion Corporation and its TOUCHSENSE® technology, allow editing multimedia content and assigning predefined vibration patterns, stored in libraries, to actions or sequences to previously recorded video or programmed games for mobiles.

One thing that corroborates that haptic information is very important for the user experience is that in a musical theme, for example, the rhythm and the strength of the sound felt in a live concert is one of the most important subjective effects for the user, so rhythm synchronized vibrations proportional to the music level reinforce the sensitivity and the real effect as if user was listening live music. Similarly, when watching sport actions (like kicking the ball in a soccer match, hitting the ball in a tennis court, riding a mountain bike or a horse, running bumps, etc.) a haptic sensation synchronized with the action notably augments the multimedia content getting a much better real sensation for the user.

An important limitation of the current technology is that the current haptic generation systems available require of the human intervention to assign haptic effects to the video. Despite unforeseen technological advancements, the current technology requires that multimedia audio files must be converted through manual conversion. This means that a human designer listens, analyzes, and judges the audio file and selects features of the sampled audio from which to create haptic effects. In fact, Immersion Corporation has numerous related patents (for instance: U.S. Pat. Nos. 8,717, 152 and 8,761,915) on semi-automatic haptic generation from audio files using different methods to generate haptic effects. Nevertheless, the method disclosed herein uses only the envelope of the signal and a histogram of the envelope to remove unimportant content based on a user defined threshold, generating a haptic pattern directly proportional to the intensity of the sampled signal envelop. Another difference is that the method here disclosed uses not only audio information to generate haptic content but it can use any other sensor output (acceleration, orientation, video intensity, temperature, pressure, etc) available in the recording device to integrate the physical haptic information with audio and video content synchronously and automatically, in order to be played later or in a streaming way by a haptic multimedia player.

Finally, another possibility is the addition of haptic effects to an interactive reading by providing different ambience effects (storm vibrations, horses steps, etc) for different paragraphs, chapters or scene allowing the enrichment of its content.

Unfortunately, vibration elements integrated in mobile phones, tablets and remote game controllers do not allow control of the vibration strength to more than a few levels making it difficult to provide the user with enough physical information to represent the variety of real sensations. Nevertheless, this method allows a higher than ever variability content using a conventional vibrational element as the ones provided for most mobile devices so providing with the best ever experience in a conventional electronic device.

None of the current applications, patents or devices allow, as this invention does, assigning multilevel and variable physical information to a multimedia file in real time in an automatic way into a multimedia file nor integrate into it to be played lately by mean of another conventional electronic device without making big changes to it or connecting other auxiliary devices.

Thus, based on these basic concepts, the method described in this patent, haptic information related to physical information and its integration in multimedia files can be used in any device or object having at least a vibration element or similar component, controlled by a programmable logic or a computer program, such element being integrated in the device or externally connected to the user by wire or wirelessly.

SUMMARY OF THE DISCLOSURE

The present disclosure is a multimedia recording and playing method to be applied in a multimedia device intended to measure and integrate physical information related to the recorded events in a multimedia file, referring video, audio, pictures, animation, games, texts, etc, and extract such physical information from the file to generate intensity variable haptic information when played according to that recorded physical information in order to simulate such physical information to the user or spectator on an electronic device.

It is another object of the present disclosure to provide means of generating variable strength haptic information related to the action played on any multimedia device by using solely its video and audio content so providing of a way to improve the user experience even though the file has not been recorded using the method disclosed during its recording.

Another object of this disclosure is to provide a computing platform that uses multimedia audio content parameters like envelope, frequencies, power, etc, in order to generate control patterns to represent variable changes in the multimedia file and generate haptic content that simulates physical parameters related to the multimedia content to improve the user experience of listening to recorded music or sound effects.

Still another object of the present disclosure is to provide means for using multimedia video content parameters like, sequence change, frequencies, light intensity, color, etc, in order to generate control patterns to represent changes in the multimedia file and generate haptic content that simulate physical parameters related to the multimedia content so improving the user experience watching already recorded music videos, films or pictures using a mobile or portable device.

Further, another object of the present disclosure is to provide means for haptic effects generation on a multimedia portable device, having the corresponding actuators, synchronized by means of a communication channel to the action, film or play scenes the user is watching in a cinema or theater.

DETAILED DESCRIPTION OF THE DISCLOSURE

Figure 1:
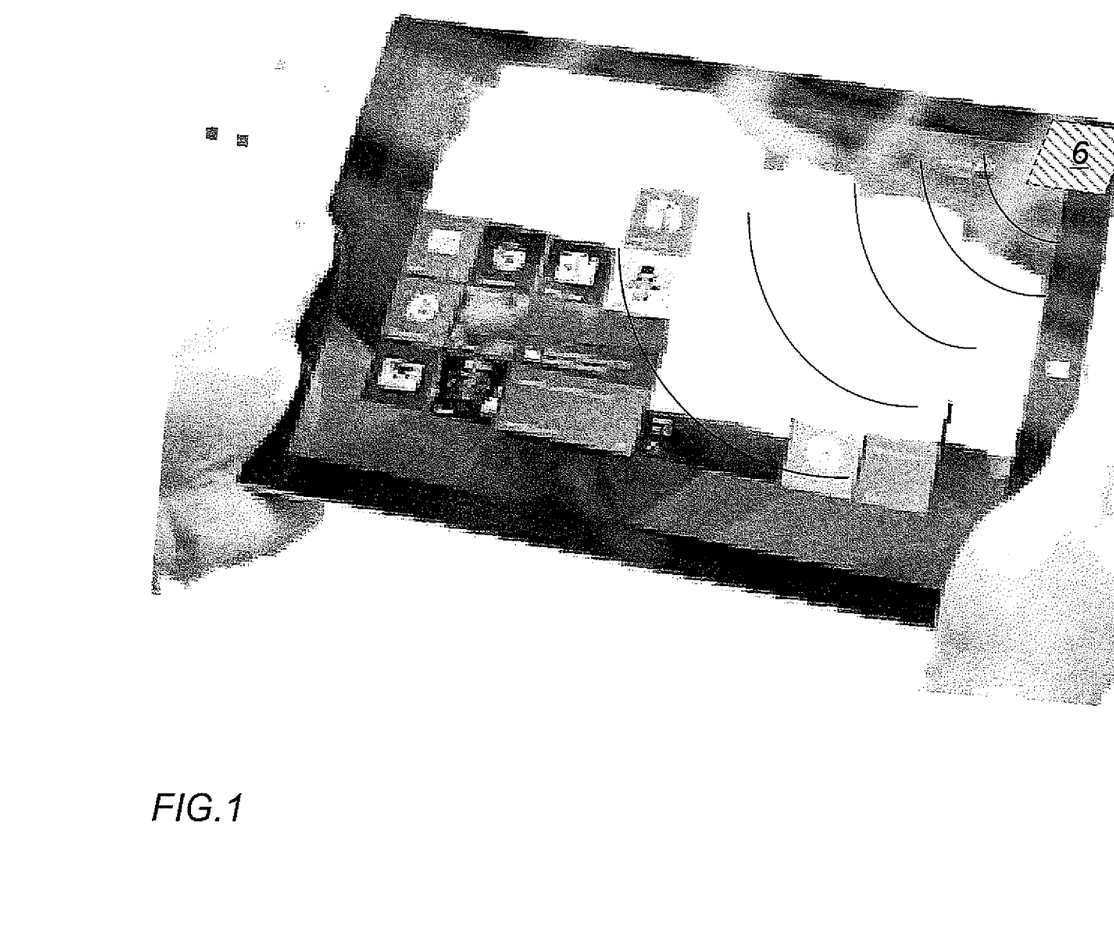
FIG. 1 shows a mobile device like a tablet or mobile phone reflecting its integrated vibration element.

FIG. 1 shows a mobile device like a tablet or mobile phone reflecting its integrated vibration element 6, in which vibrational waves propagate through the device allowing the user feel haptic sensations on his/her hands while it is working.

Figure 2:
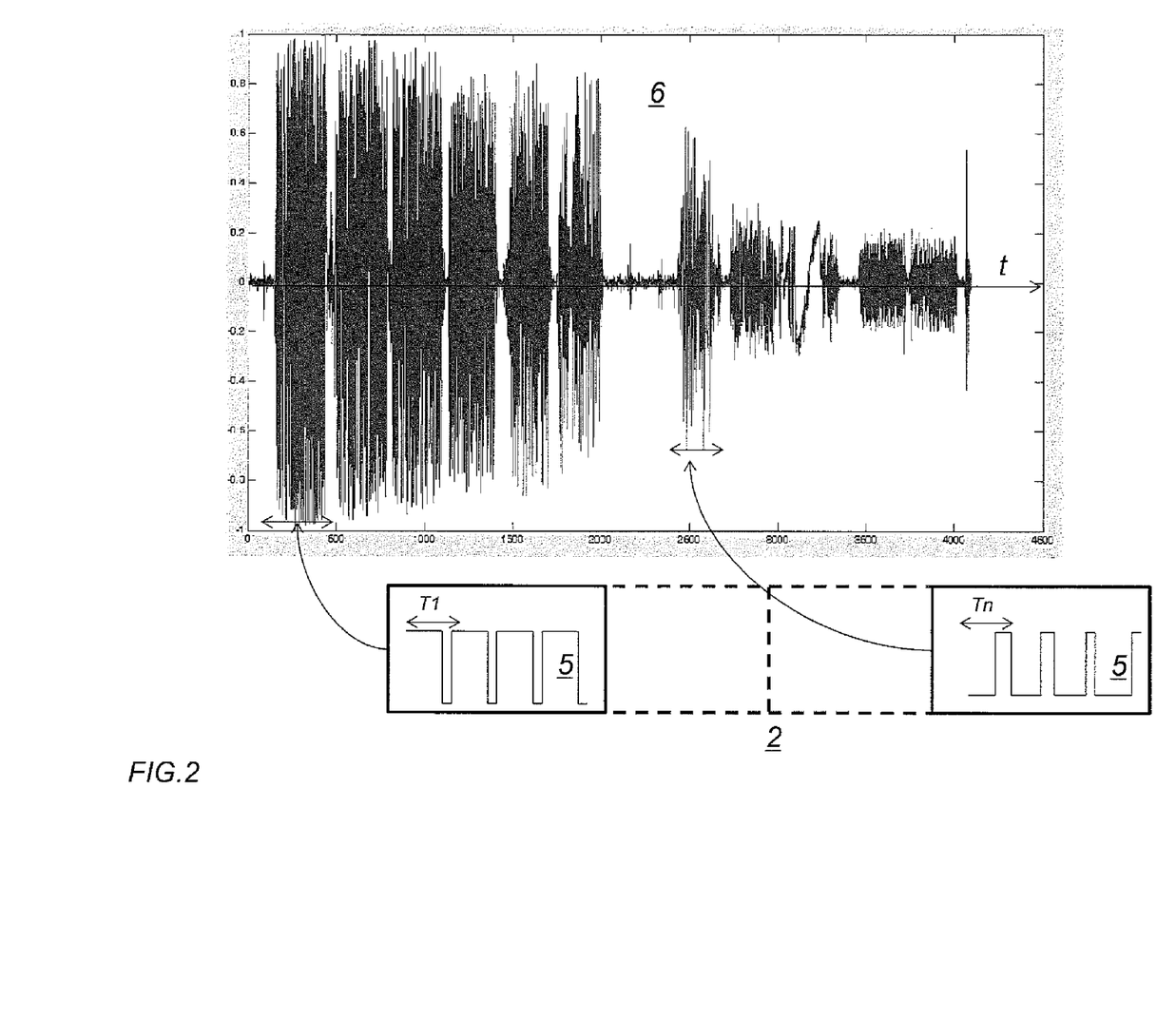
FIG. 2 shows an example of a vibration strength measurement.

FIG. 2 is an example of a vibration strength measurement. The method disclosed is implemented in a computer program installed in a conventional tablet and showing the different levels of vibration that can be generated using a conventional integrated tablet vibrator 6, as a function of the defined control patterns 5, generated by using a different frequency, duration and duty cycle pulses, stored in the tablet's internal memory 2, thus, generating multiple levels of haptic effects by using a conventional constant strength integrated vibrator.

Figure 3:
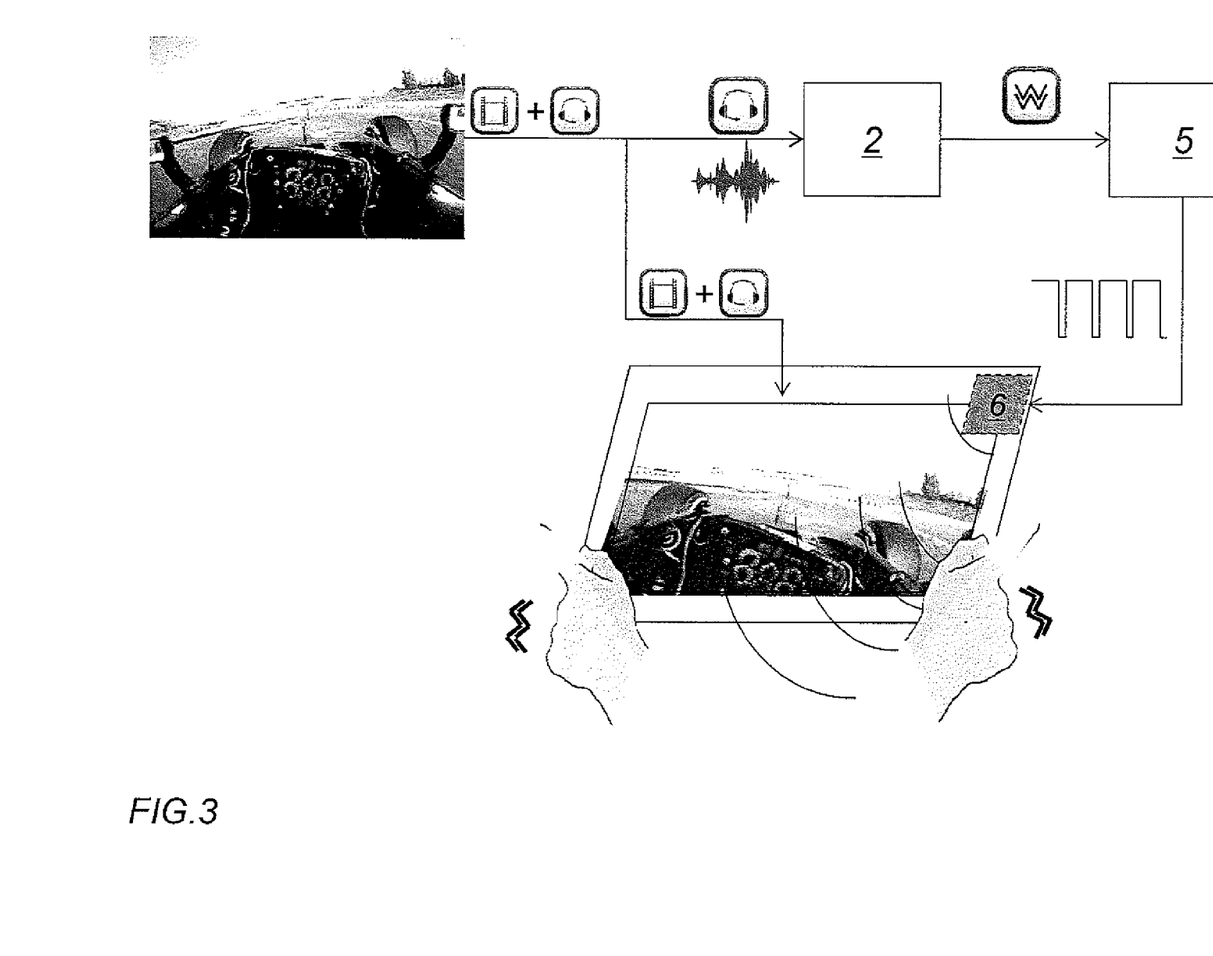
FIG. 3 is a block diagram showing the structure of a multimedia player device including haptic information integrated by employing the method disclosed herein.

FIG. 3 is a block diagram showing the structure of a multimedia player device including haptic information integrated by employing the method disclosed herein. According to a preferred embodiment, a mobile device, like for example, a tablet with an integrated vibrator 6, where the video and audio parameters (specifically audio envelope and video light intensity envelope) are processed to extract simulated and related physical information 4 and generate vibrational control haptic patterns 5 according to the intensity of the extracted information, generating variable proportional intensity haptic information by means of the vibrator 6.

Figure 4:
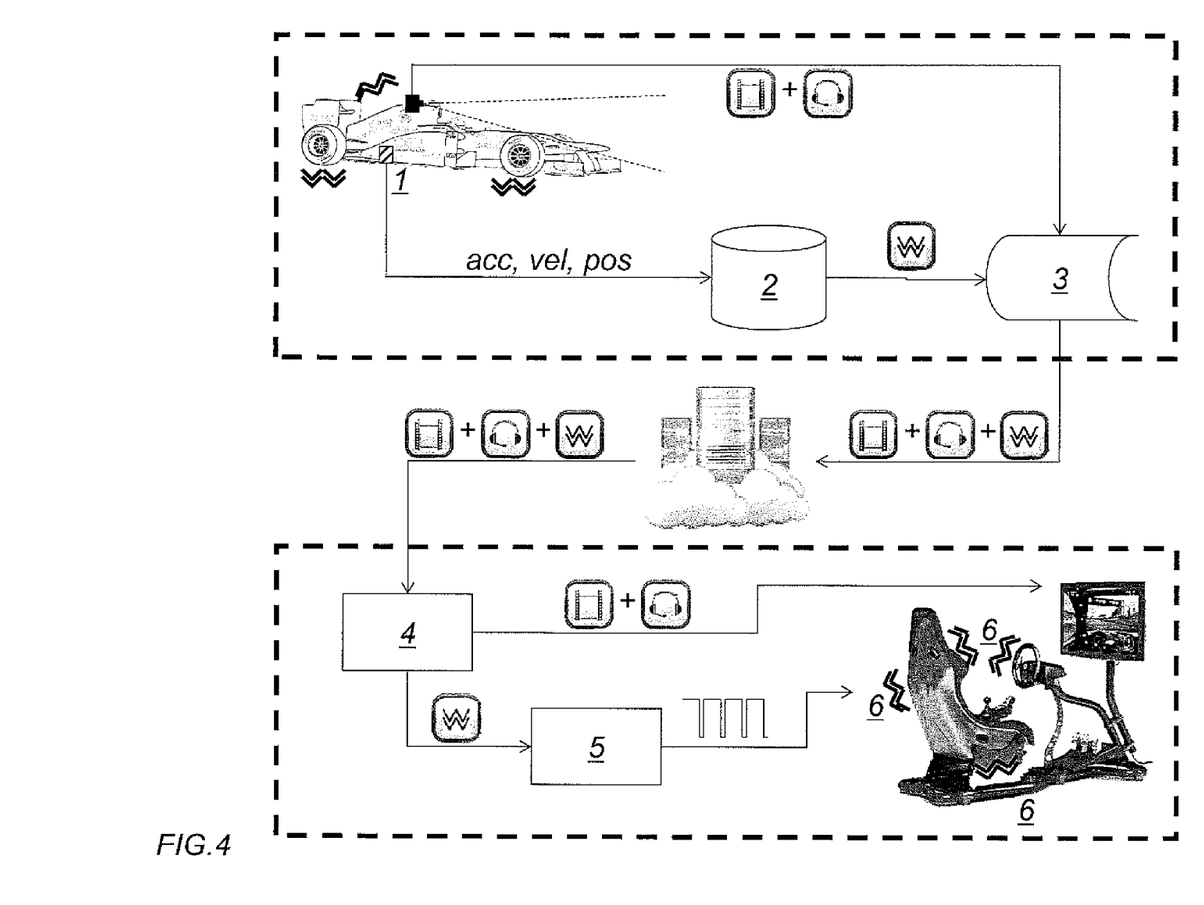
FIG. 4 shows a possible real time application of the method to a multimedia recording device integrated in a formula one car.

FIG. 4 shows a possible real time application of the method to a multimedia recording device integrated in a formula one car where, in the recording stage (up), physical parameters are sensed by the sensors 1 synchronized with the video and audio recorded and generating the control patterns associated with the actions 2 being stored in a final multimedia file 3 integrating the audio, video and haptic information. This file may be uploaded to a server by means of a communication channel. The file can be reproduced in the reproducing stage (down) in real time, synchronously as the recording stage is taking place, or asynchronously from a local or remote site extracting the haptic information 4 and regenerating the related control patterns 5 in an external platform composed by a game seat having different actuators, vibrators and the like, in different points 6 and also in the steering wheel in order to generate a realistic driving simulation synchronizing real car physical parameters with the audio and video associated displayed in a conventional frontal screen.

Figure 5:
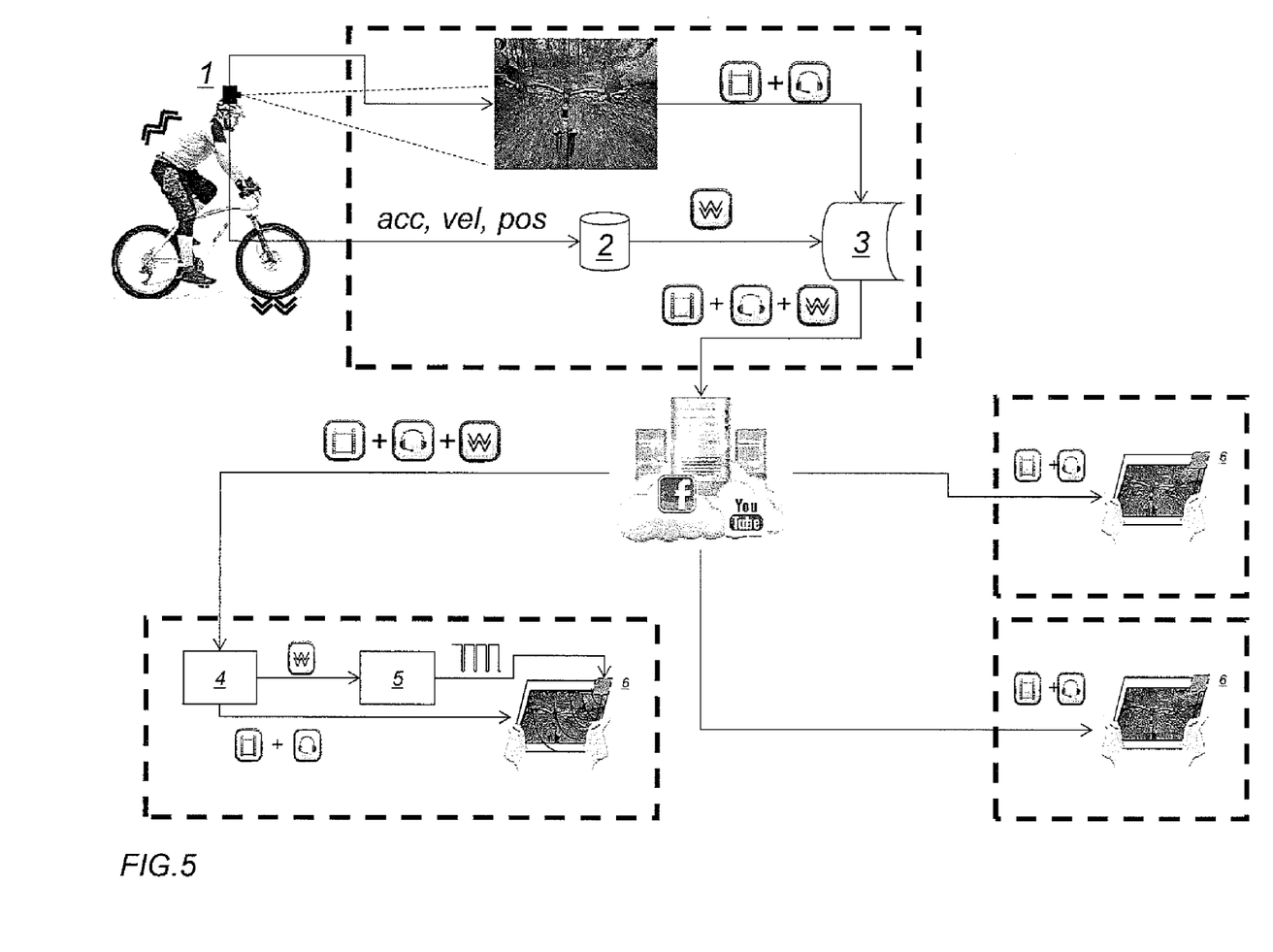
FIG. 5 shows a possible application of the method to a multimedia sharing application for mobile phones or tablets where user record a video using his/her own mobile phone attached to a mountain bike or helmet.

FIG. 5 shows a possible application of the method to a multimedia sharing application for mobile phones or tablets where user record a video using his/her own mobile phone attached to a mountain bike or helmet. The mobile application is continuously recording video, audio, physical vibrations and location parameters using the integrated mobile phone sensors (accelerometer, gyroscope, GPS, etc) 1 synchronized with the video and audio recorded and generating the control patterns associated with the strength or intensity of the actions 2 being stored in a final multimedia file 3 integrating the audio, video and haptic information recorded. The file is uploaded using Internet to a sharing platform like Youtube, Facebook or the like. The file can be reproduced by his/her authorized friends in real time, providing that they have the player application installed in their mobile phones. The player application extracts the physical information 4 from the file and generates the related intensity or strength dependent control patterns 5, generating the haptic content using the integrated vibrator of their phones or tablets 6. As can be plainly seen, users without the application installed (right) can play the multimedia file but without the corresponding haptic information.

Figure 6:
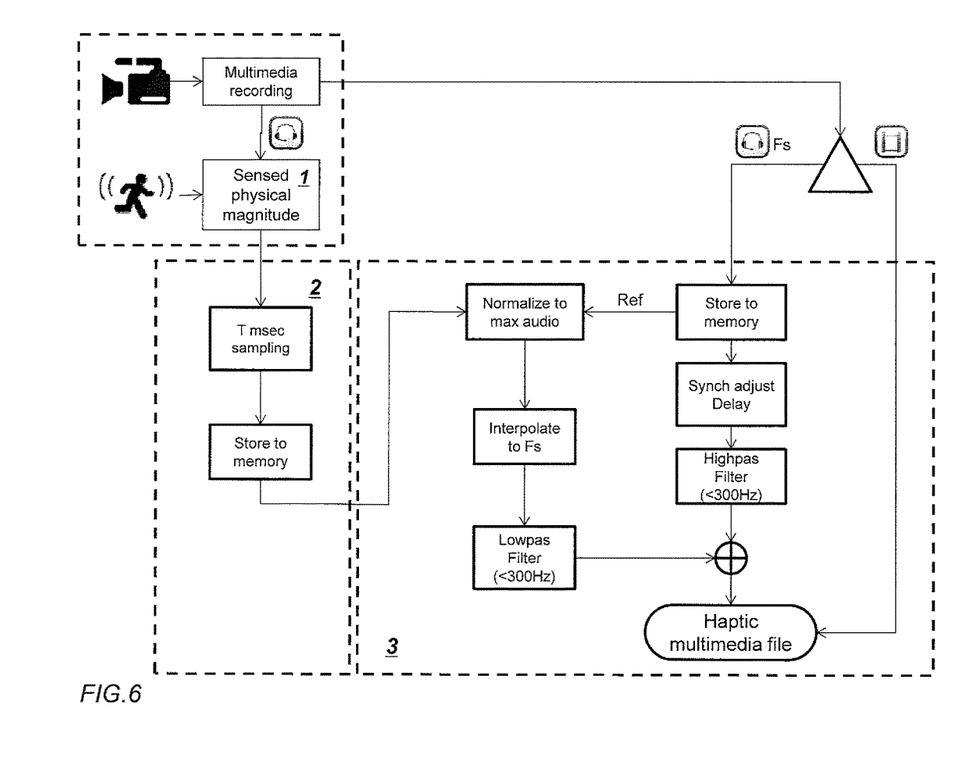
FIG. 6 shows a possible process disclosed using a sensed physical magnitude signal.

FIG. 6 shows a possible process disclosed using a sensed physical magnitude signal 1 like, acceleration, speed, environment temperature, acoustic, and the like. This magnitude is rectified and low-pass filtered to obtain its envelope, the result is down-sampled every T milliseconds, normalized in amplitude, and the N values quantization histogram of its samples is calculated. After removing higher values in the histogram, that appear a number of times lower than a given threshold, the signal is normalized again and quantized using N bits that will be the strength values of the haptic table 2, to be applied when playing the haptic multimedia resulting file. The resulting file 3 will be a combination of the original multimedia video/audio file delayed to adjust to the haptic extraction processing delay synchronized with video and audio with the haptic information signal encoded with N bits.

Notably, it is necessary to provide a method to integrate haptic information independently of the digital format of the multimedia file in order to avoid data corruption when the multimedia file is converted, compressed, or encoded to different formats as it is typically done in different platforms. As such, the method includes encoding the haptic information by using the audio tracks of a video file. In this way, users can encode up to two sensors of haptic information in a stereo audio track or more by using multi-language tracks video. The method may also be performed using 5.1 surround sound or any other type of surround sound format.

Audio encodings generally respect the lowest frequencies of the audio independently of the codec used. According to a preferred embodiment, the method includes extracting the audio track content data of the multimedia file where the haptic information is to be integrated. After the haptic information is obtained, a low pass filter with fc cutoff frequency (lower than 300 Hz) is applied to it. The haptic data is then normalized to a maximum audio value. A high pass filter with fc cutoff frequency (higher or equal than 300 Hz) to the audio content. Both of these signals are combined together to generate the total multimedia audio content, which includes the haptic information. Finally, the final audio/video multimedia file is regenerated in the original format using the new audio track (including the haptic information) as the audio track content.

Figure 7:
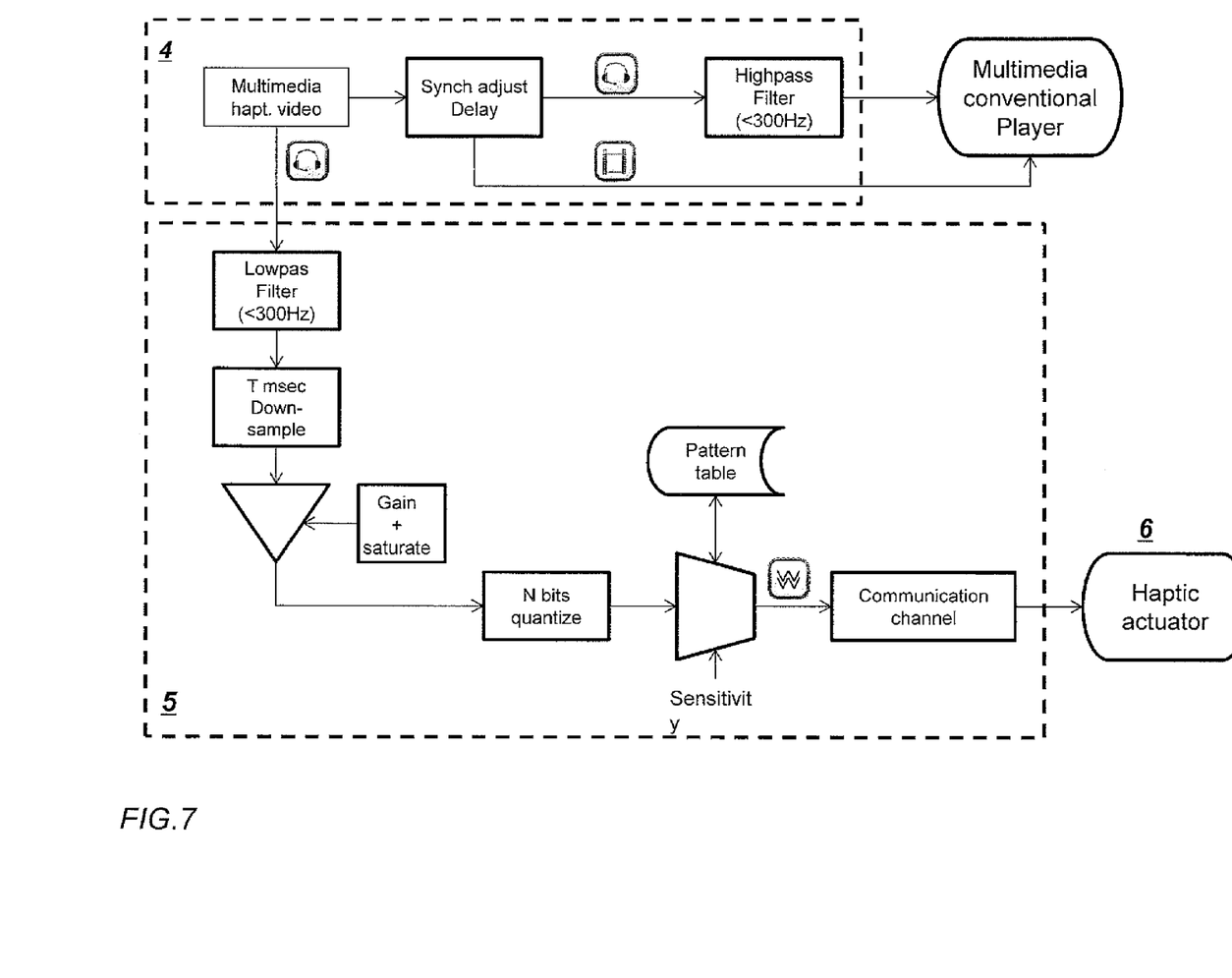
FIG. 7 shows the extraction process and generation of haptic actuation on a player device of haptic multimedia files.

FIG. 7 shows the extraction process 4 and generation of haptic actuation on a player device of haptic multimedia files where it extracts video and audio content from file and directs them to the audio and video content player. Simultaneously, it extracts the N bits haptic content, using the method described above, and applies it to a strength haptic table to read the control patterns 5 in order to excite the actuator 6 accordingly.

The file can be reproduced in the reproducing stage (down) in real time, synchronously as the recording stage is taking place, or asynchronously from a local or remote site extracting the haptic information 4 and regenerating the related control patterns 5 in an external platform composed by a game seat having different actuators, vibrators and the like, in different points 6 and also in the steering wheel in order to generate a realistic driving simulation synchronizing real car physical parameters with the audio and video associated displayed in a conventional frontal screen.

Figure 8:
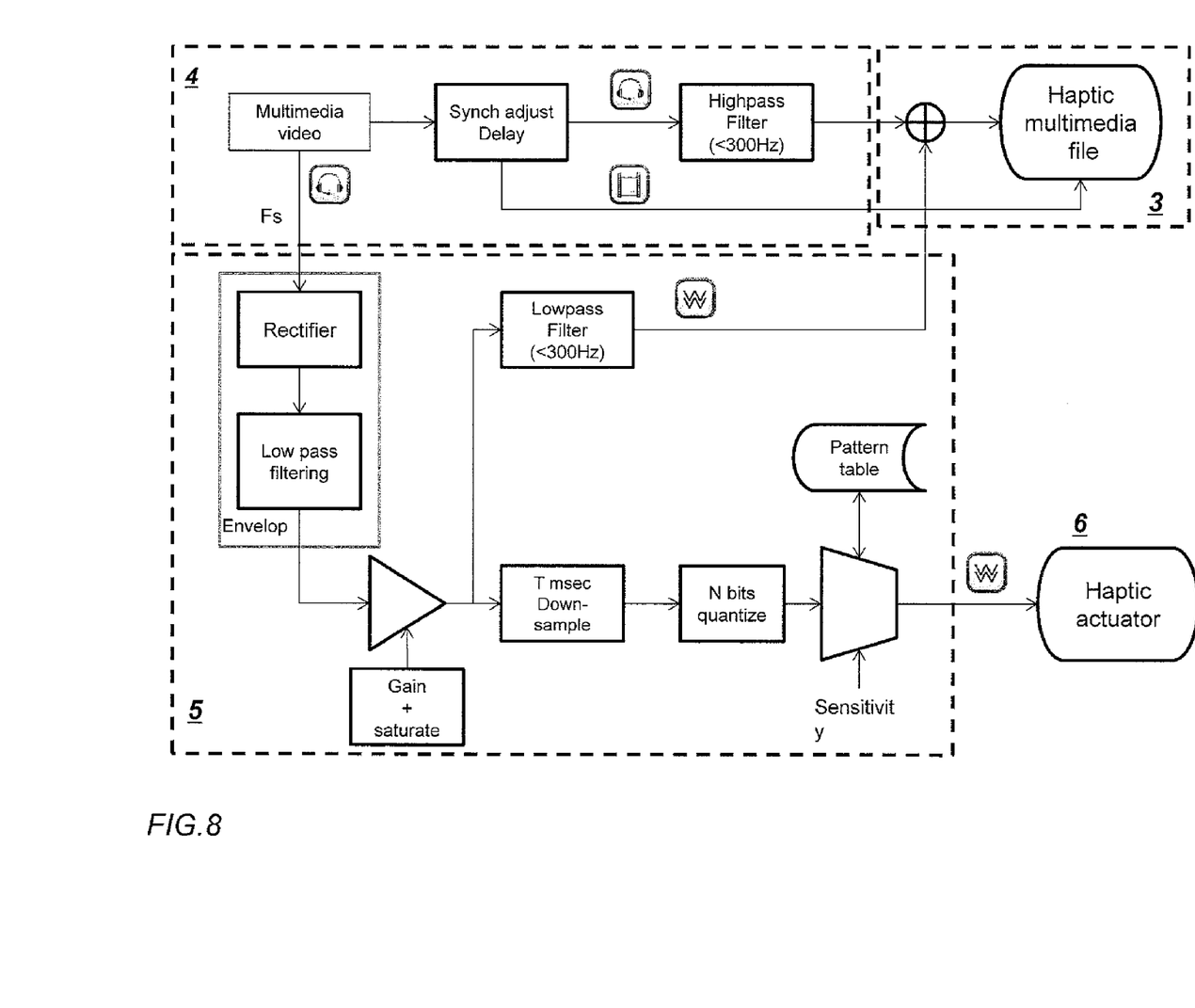
FIG. 8 shows a possible process disclosed for automatic generation of haptic content from audio/video sources.

FIG. 8 shows a possible process disclosed for automatic generation of haptic content from audio/video sources. The file can be reproduced in real time, synchronously as the recording stage is taking place, or asynchronously from a local or remote site extracting the haptic information 4 and regenerating the related control patterns 5 in an external platform having at least one haptic actuator 6. When reproducing the haptic multimedia file, the method includes synchronizing the physical parameters with the multimedia associated to it.

According to a preferred embodiment of the method, when the haptic content is reproduced in real-time the method includes sampling the resulting data every T milliseconds to obtain a haptic content. Said haptic content is then quantized using N bits, depending on the levels of strength allowed by the at least one haptic actuator 6. The quantized content is later fed to a table of control patterns, stored previously or calculated, obtaining a pattern that is directly related with the strength level of the haptic sample to be generated and also depending on the user sensitivity adjustments. This pattern is finally fed to the at least one haptic actuator 6 which in turn reproduces the haptic sensation.

According to a preferred embodiment, when the haptic content is to be integrated in the multimedia file, a low pass filter with fc cutoff frequency (lower than 300 Hz) is applied to the haptic information. Later, a high pass filter is applied to the original multimedia file audio content using fc as cutoff frequency (higher or equal than 300 Hz). Both of these signals are combined together to generate the total multimedia audio content, which includes the haptic information. Finally, the final audio/video multimedia file is regenerated in the original format using the new audio track (including the haptic information) as the audio track content.

Figure 9:
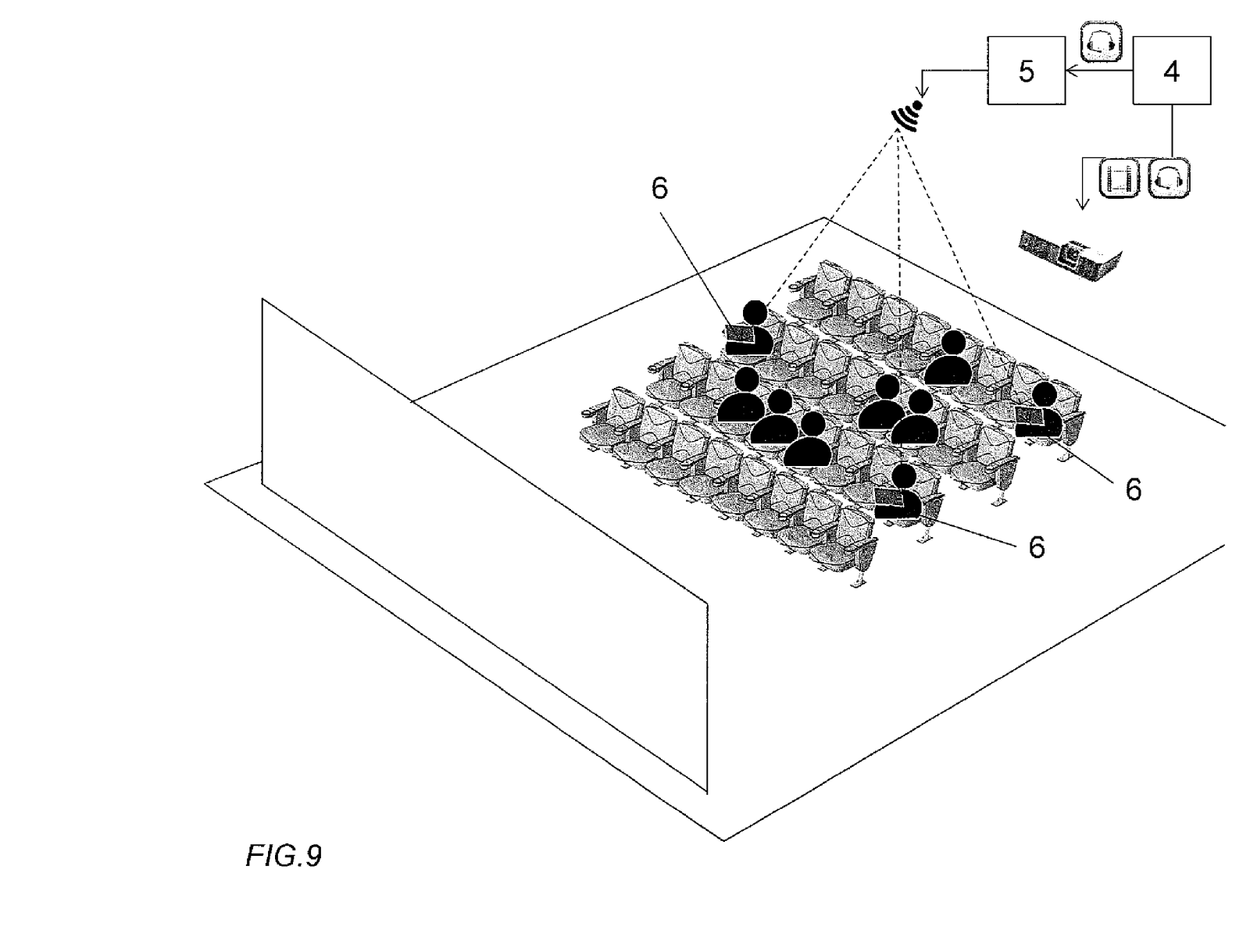
FIG. 9 shows a possible method of synchronization using an external haptic video.

FIG. 9 shows a possible method of synchronization using an external haptic video. Assuming that haptic videos are ordinary videos with haptic content embedded, some users may want to experience the haptic content and others may not. In the case of a film, users can experience the haptic content using their own smartphones and/or tablets by synchronizing film haptic content using a communication channel provided by the cinema.

According to a preferred embodiment, the user connects its haptic application to the cinema network by using a provided key o by paying directly using an application. Once connected, the user receives the haptic content continuously in its application, synchronized with the film content by means of a communication channel. The communication channel may be any means of communication using a mobile device such as Wi-Fi, Bluetooth, Infrared, or even using the film audio track to embed the haptic content.

Referring now to the disclosure in more detail, the present multimedia recording and playing method, to be applied in a multimedia device, comprises at least of a multimedia recording programmable device, such as a personal computer, mobile phone, tablet or any other device having computation characteristics, having integrated or connected sensors 1 that capture physical parameters (acceleration, velocity, position, temperature, smell, etc.), called haptic information related with the action being recorded, a block generates control patterns 2 according to those physical parameters strength or intensity and integrate them together with the recorded multimedia file in a new multimedia file, adding a new haptic track 3 to it that can be stored locally or remotely in a server using a communication channel.

The method also comprises a multimedia-playing device that includes a computing platform having a set of instructions to load the multimedia file and extract the associated haptic information from it as well as the rest of the multimedia information 4. The haptic information is processed obtaining the corresponding control patterns 5. The patterns are created by using a mathematical formula or a table of pause and pulse durations to generate different intensities and frequencies, and the synchronization information in order to generate the simulated physical stimuli, using at least a controlled actuator like a vibrating motor or the like 6, synchronized with the multimedia information that is played in a conventional way.

In order to clarify how the disclosure works, specifically in FIG. 6, a recording and pattern generation multimedia system is shown. Using the disclosed method, multimedia haptic content can be generated and integrated in a general physical activity recording, where physical magnitude sensors 1 are installed to capture inertial and vibrational information together with cameras and microphones to record what the user is experiencing during the recording. Those physical magnitudes are processed in time to extract and convert them to vibrational patterns 2. The process can consist of rectifying and low-pass filtering to obtain its envelope, the result is down-sampled every T milliseconds (that will depend on the actuator physical limits), normalized in amplitude, and the N values quantization histogram of its samples is calculated. After removing higher values in the histogram (those that appear a number of times lower than a given user selected threshold), the signal is normalized again and quantized using N bits that will be the strength values of the haptic table to be applied when playing the haptic multimedia resulting file. Haptic information will be encoded and integrated with the video and audio information in a new haptic multimedia file adding a new haptic track 3. The file containing the haptic multimedia information can be stored in a remote server by means of a communication channel via Internet, for instance. Simultaneously, the player device, in FIG. 7, is connected to Internet; the player user downloads the haptic multimedia file streaming 4 where video/audio is played in a conventional audio/video screen system, and haptic information is extracted and sent to the pattern-decoding block 5 where vibrational patterns, based on different sequences of pauses and pulses duration, are generated in order to control the vibrational actuators strength and frequency 6 synchronously with the video and audio information in order to provide of a rich real time user experience simulating the real recorded physical effects.

The advantages of the present disclosure include, without limitation that it is easy to implement by a software application. It also has the advantage of working in current mobile devices having the required hardware: at least an accelerometer and/or gyroscope to record physical parameters, a controlled vibration motor to generate the related haptic effects, a screen, speaker for audio output) and a keyboard or touch screen. Also, a strength-controlled vibrator is not necessary since a conventional constant strength vibrator, like those typically integrated on current mobile devices, is sufficient in order to generate multi level haptic effects of different strength.

The disclosure is not limited to the precise configuration described above. While the disclosure has been described as having a preferred design, it is understood that many changes, modifications, variations and other uses and applications of the subject disclosure will, however, become apparent to those skilled in the art without materially departing from the novel teachings and advantages of this disclosure after considering this specification together with the accompanying drawings. Accordingly, all such changes, modifications, variations and other uses and applications which do not depart from the spirit and scope of the disclosure are deemed to be covered by this disclosure as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present disclosure, as well as equivalents thereof. The details in the patents, patent applications, and publications incorporated by reference herein may be considered to be incorporable at applicant's option, into the claims during prosecution as further limitations in the claims to patently distinguish any amended claims from any applied prior art.

What is claimed is:

1. A haptic generation and integration system for multimedia devices comprising:
    a first multimedia video/audio recording device comprising a first sensor to measure physical magnitudes related with the recording action and a first computer platform including a first processor and a first set of machine-readable instructions, wherein said first set of machine-readable instructions are configured to process the physical magnitudes to generate control patterns depending on their frequency and intensity, integrate those patterns synchronized with the audio/video information, and store the resulting multimedia information locally in a memory or remotely in a server; and
    a second multimedia player device comprising at least an actuator to generate haptic information related to physical magnitudes, and a second computer platform including a second processor and a second set of machine-readable instructions; wherein said first multimedia device is configured to record haptic multimedia information, integrate it with the rest of the multimedia content and send it through a network to be used by said second multimedia player device, wherein said second set of machine-readable instructions is configured to play said multimedia information, extract the related haptic information and generate control signals to haptic actuators synchronized to the recorded multimedia information, and wherein the physical haptic information is integrated synchronously in the multimedia file by using the lowest part of the spectrum in at least one of the multimedia audio tracks.

2. The haptic generation and integration system for multimedia devices of claim 1, wherein said first sensor is an accelerometer and/or gyroscope to measure vibration and position of the recording device.

3. The haptic generation and integration system for multimedia devices of claim 1, wherein said first sensor is a pressure, temperature or odor (smell) sensor.

4. The haptic generation and integration system for multimedia devices of claim 1, wherein said second multimedia device actuator is composed by a controlled vibrator motor integrated or externally connected to the user.

5. The haptic generation and integration system for multimedia devices of claim 1, wherein said second multimedia device actuator is composed by a controlled electro-stimulation element integrated or externally connected to the user.

6. The haptic generation and integration system for multimedia devices of claim 1, wherein said second multimedia device actuator is composed by a controlled temperature generator integrated or externally connected to the user.

7. The haptic generation and integration system for multimedia devices of claim 1, wherein said second multimedia device actuator is composed by a controlled smell generator integrated or externally connected to the user.

8. A haptic generation and integration system for multimedia devices comprising:

a first multimedia video/audio recording device comprising a first sensor to measure physical magnitudes related with the recording action and a first computer platform including a first processor and a first set of machine-readable instructions, wherein said first set of machine-readable instructions are configured to process the physical magnitudes to generate control patterns depending on their frequency and intensity, integrate those patterns synchronized with the audio/video information, and store the resulting multimedia information locally in a memory or remotely in a server; and a second multimedia player device comprising at least an actuator to generate haptic information related to physical magnitudes, and a second computer platform including a second processor and a second set of machine-readable instructions; wherein said first multimedia device is configured to record haptic multimedia information, integrate it with the rest of the multimedia content and send it through a network to be used by said second multimedia player device, wherein said second set of machine-readable instructions is configured to play said multimedia information, extract the related haptic information and generate control signals to haptic actuators synchronized to the recorded multimedia information, and wherein the physical haptic information is integrated synchronously in the multimedia file by inserting at least a new audio track containing such information.

9. The haptic generation and integration system for multimedia devices of claim 8, wherein said first sensor is an accelerometer and/or gyroscope to measure vibration and position of the recording device.

10. The haptic generation and integration system for multimedia devices of claim 8, wherein said first sensor is a pressure, temperature or odor (smell) sensor.

11. The haptic generation and integration system for multimedia devices of claim 8, wherein said second multimedia device actuator is composed by a controlled vibrator motor or controlled electro-stimulation element integrated or externally connected to the user.

12. The haptic generation and integration system for multimedia devices of claim 8, wherein said second multimedia device actuator is composed by a controlled temperature generator or controlled smell generator integrated or externally connected to the user.

13. A haptic generation and integration system for multimedia devices comprising:

a first multimedia video/audio recording device comprising a first sensor to measure physical magnitudes related with the recording action and a first computer platform including a first processor and a first set of machine-readable instructions, wherein said first set of machine-readable instructions are configured to process the physical magnitudes to generate control patterns depending on their frequency and intensity, integrate those patterns synchronized with the audio/video information, and store the resulting multimedia information locally in a memory or remotely in a server; and a second multimedia player device comprising at least an actuator to generate haptic information related to physical magnitudes, and a second computer platform including a second processor and a second set of machine-readable instructions; wherein said first multimedia device is configured to record haptic multimedia information, integrate it with the rest of the multimedia content and send it through a network to be used by said second multimedia player device, wherein said second set of machine-readable instructions is configured to play said multimedia information, extract the related haptic information and generate control signals to haptic actuators synchronized to the recorded multimedia information, and wherein said second set of machine-readable instructions is configured to obtain the haptic control signals from the multimedia file audio track parameters like, volume, envelope, frequency, amplitude or power.

14. The haptic generation and integration system for multimedia devices of claim 13, wherein the physical haptic information is integrated synchronously in the multimedia file by creating a package including the original multimedia file and the physical haptic description files.

15. The haptic generation and integration system for multimedia devices of claim 13, wherein said second multimedia device actuator is composed by a controlled vibrator motor or controlled electro-stimulation element integrated or externally connected to the user.

16. A haptic generation and integration system for multimedia devices comprising:

a first multimedia video/audio recording device comprising a first sensor to measure physical magnitudes related with the recording action and a first computer platform including a first processor and a first set of machine-readable instructions, wherein said first set of machine-readable instructions are configured to process the physical magnitudes to generate control patterns depending on their frequency and intensity, integrate those patterns synchronized with the audio/video information, and store the resulting multimedia information locally in a memory or remotely in a server; and a second multimedia player device comprising at least an actuator to generate haptic information related to physical magnitudes, and a second computer platform including a second processor and a second set of machine-readable instructions; wherein said first multimedia device is configured to record haptic multimedia information, integrate it with the rest of the multimedia content and send it through a network to be used by said second multimedia player device, wherein said second set of machine-readable instructions is configured to play said multimedia information, extract the related haptic information and generate control signals to haptic actuators synchronized to the recorded multimedia information, and wherein said second set of machine-readable instructions is configured to obtain the haptic control signals from the multimedia file video track parameters like, scene change, chromatic, light intensity, frequencies.

17. The haptic generation and integration system for multimedia devices of claim 13, wherein said second multimedia device actuator is composed by a controlled temperature generator or controlled smell generator integrated or externally connected to the user.

18. The haptic generation and integration system for multimedia devices of claim 16, wherein said second multimedia device actuator is composed by a controlled vibrator motor or controlled electro-stimulation element integrated or externally connected to the user.

19. The haptic generation and integration system for multimedia devices of claim 16, wherein said second multimedia device actuator is composed by a controlled temperature generator or controlled smell generator integrated or externally connected to the user.

20. The haptic generation and integration system for multimedia devices of claim 16, wherein the physical haptic information is integrated synchronously in the multimedia file by creating a package including the original multimedia file and the physical haptic description files.

* * * * *